(12) United States Patent
Takagi et al.

(10) Patent No.: US 8,329,766 B2
(45) Date of Patent: *Dec. 11, 2012

(54) FUNCTIONAL MEMBRANE AND PRODUCTION METHOD THEREOF, AND ELECTROLYTE MEMBRANE FOR USE IN FUEL CELL AND PRODUCTION METHOD THEREOF

(75) Inventors: Shigeharu Takagi, Aichi (JP); Toshiya Saito, Susono (JP); Misaki Kobayashi, Aichi (JP); Masaru Yoshida, Takasaki (JP); Tetsuya Yamaki, Takasaki (JP); Masaharu Asano, Takasaki (JP)

(73) Assignees: Japan Atomic Energy Agency, Ibaraki (JP); Toyota Jidosha Kabushiki Kaisha, Toyota (JP)

( * ) Notice: Subject to any disclaimer, the term of this patent is extended or adjusted under 35 U.S.C. 154(b) by 1283 days.

This patent is subject to a terminal disclaimer.

(21) Appl. No.: 11/884,786

(22) PCT Filed: Feb. 23, 2006

(86) PCT No.: PCT/JP2006/003925
§ 371 (c)(1),
(2), (4) Date: Jan. 8, 2008

(87) PCT Pub. No.: WO2006/090898
PCT Pub. Date: Aug. 31, 2006

(65) Prior Publication Data
US 2008/0171251 A1    Jul. 17, 2008

(30) Foreign Application Priority Data

Feb. 24, 2005  (JP) .................. 2005-048872
May 9, 2005    (JP) .................. 2005-136457

(51) Int. Cl.
C08J 5/20    (2006.01)
C08J 7/18    (2006.01)
B01J 47/00   (2006.01)
B01J 47/12   (2006.01)
B01J 41/00   (2006.01)

(52) U.S. Cl. .......... 521/27; 521/30; 428/319.7; 429/494
(58) Field of Classification Search ............ 429/33; 521/27; 428/319.7
See application file for complete search history.

(56) References Cited

U.S. PATENT DOCUMENTS 3,632,387 A * 1/1972 Sutherland ............. 427/307
(Continued)

FOREIGN PATENT DOCUMENTS

JP    B 3-22301    3/1991
(Continued)

OTHER PUBLICATIONS

Yoshida et al., "Novel Think Film with Cylindrical Nanopores That Open and Close Depending on Temperature: First Successful Synthesis." Macromolecules, 1996, 29, 8987-8989.*

(Continued)

*Primary Examiner* — Randy Gulakowski
*Assistant Examiner* — Kara Boyle
(74) *Attorney, Agent, or Firm* — Oliff & Berridge, PLC (57) ABSTRACT

A functional membrane and a production method thereof including: an ion irradiation step in which a polymer film substrate is irradiated with high energy heavy ions at $10^4$ to $10^{14}$ ions/cm$^2$, to generate active species in the film substrate; and a graft polymerization step in which after the ion irradiation step, the film substrate is added with one or more monomers selected from a group A consisting of monomers each having a functional group and 1 to 80 mol % of a monomer including a group B consisting of a crosslinking agent(s) for the group A monomer(s), and the film substrate and the monomer(s) are graft-polymerized. There is obtained a functional membrane having high functionality in conjunction with the gas barrier property intrinsically possessed by a polymer film substrate, in particular, a polymer electrolyte membrane optimal as a polymer electrolyte membrane for use in fuel cells, high in proton conductivity and excellent in gas barrier property.

10 Claims, 3 Drawing Sheets

U.S. PATENT DOCUMENTS

| | | | |
|---|---|---|---|
| 7,276,561 B2 * | 10/2007 | Yoshida et al. | 525/276 |
| 2005/0049320 A1 * | 3/2005 | Yoshida et al. | 521/27 |
| 2005/0147860 A1 | 7/2005 | Yamaguchi et al. | |

FOREIGN PATENT DOCUMENTS

| | | | |
|---|---|---|---|
| JP | A 6-80794 | | 3/1994 |
| JP | B2 7-94156 | | 10/1995 |
| JP | A-11-135137 | | 5/1999 |
| JP | 2001-348439 | * | 12/2001 |
| JP | A 2001-348439 | | 12/2001 |
| JP | A 2002-348389 | | 12/2002 |
| JP | 2003-082129 | * | 3/2003 |
| JP | A 2003-82129 | | 3/2003 |
| JP | A 2003-261697 | | 9/2003 |
| JP | A 2004-55382 | | 2/2004 |
| WO | WO 03/075386 A1 | | 9/2003 |

OTHER PUBLICATIONS

Shirkova et al., "Graft polymerization into the latent tracks of some perfluoropolymers films irradiated by heavy ions." Radiation Measurements (2001), 34, pp. 61-64.*

Kudoh, H., et al. "Observation of Latent Tracks Formed by Heavy Ion Irradiation in Poly(methyl methacrylate)," *Journal of Polymer Science*, Part B: Polymer Physics, vol. 39, No. 7, pp. 757-762, Apr. 1, 2004.

Japanese Office Action issued in Japanese Patent Application No. 2007-504840 dated Jun. 11, 2010 (with partial translation).

* cited by examiner

Membrane (Enlargement)

Membrane

Fig. 3

FUNCTIONAL MEMBRANE AND PRODUCTION METHOD THEREOF, AND ELECTROLYTE MEMBRANE FOR USE IN FUEL CELL AND PRODUCTION METHOD THEREOF

PARTIES TO A JOINT RESEARCH AGREEMENT

This application is a result of activities undertaken within the scope of a joint research agreement between Toyota Jidosha Kabushiki Kaisha and Japan Atomic Energy Agency that was in effect on or before the date of the research leading to this application was made.

TECHNICAL FIELD

The present invention relates to a new functional membrane prepared by utilizing latent tracks formed by high energy heavy ions or by utilizing ion beam perforation with high energy heavy ions and a production method thereof, and an electrolyte membrane excellent in gas barrier property for use in a fuel cell and a production method thereof.

More specifically, the present invention relates to functional membranes suitable for biomimetic bioreactors, biomass conversion reactors obtained by immobilizing enzymes, ion exchange membranes excellent in ion conductivity and ion selectivity, ion exchange membranes for use in secondary batteries and fuel cells, multilayered functional membranes and three-layered membranes, and selective amino acid separation membranes utilizing electrodialysis and the like, and relates to production methods of such functional membranes.

Further, the present invention relates to a production method of a solid polymer electrolyte membrane that is a polymer ion exchange membrane suitable for use in fuel cells. In particular, the present invention relates to a solid polymer electrolyte membrane that is a solid polymer membrane suitable for fuel cells and has an excellent gas barrier property and an excellent ion exchange capacity, and relates to a production method of such a membrane.

BACKGROUND ART

A fuel cell is a device in which a fuel such as hydrogen or methanol is electrochemically oxidized in the cell and the chemical energy of the fuel is thereby converted directly into electrical energy to be taken out. Recently, fuel cells have attracted attention as clean supply sources of electrical energy. In particular, solid polymer fuel cells that use proton conducting membranes as electrolytes are expected to be promising as electrical power supplies for electric automobiles because such fuel cells are high in output power density and capable of being operated at low temperatures.

The fundamental structure of such a solid polymer fuel cell has a structure which is constituted with an electrolyte membrane and a pair of gas diffusion electrodes each having a catalyst layer and respectively joined to both sides of the electrolyte membrane, and further with two current collectors respectively disposed on the gas diffusion electrodes. Thus, one gas diffusion electrode (anode) is fed with hydrogen or methanol as a fuel, and the other gas diffusion electrode (cathode) is fed with oxygen or air as an oxidant; an external load circuit is connected between both gas diffusion electrodes, and this structure thereby operates as a fuel cell. In this case, the protons generated in the anode migrate through the electrolyte membrane to the cathode side to react with oxygen to generate water. Thus, the electrolyte membrane functions as a migration medium for protons and a diaphragm for hydrogen gas and oxygen gas. Accordingly, a polymer electrolyte membrane for a fuel cell is required to be high in proton conductivity, strength and chemical stability, and further to be excellent in gas barrier property.

In this connection, what are conventionally referred to as functional membranes suffer from problems such that functional groups are distributed randomly over a whole membrane, and in the cases of labyrinth membranes and mesh membranes having functional groups, it is impossible to control the spatial distribution of the functional groups and the functional group density.

Specifically, commercially available electrolyte membranes such as Nafion (trade name) and solid polymer electrolyte membranes produced by means of radiation graft polymerization each have hydrophilic cation exchange groups uniformly distributed in the interior of the membrane, hence are swollen by excessive hydration to weaken the intermolecular interaction, and consequently, suffer from the occurrence of excessive crossover of hydrogen or methanol. Additionally, for example, Gore Co. and Tokuyama Co., Ltd. have made some attempts to fill porous membranes having three-dimensionally continuous pores of extremely high porosity with ion exchange resins; however, some ion exchange resin fractions are not involved in cation exchange to result also in extreme swelling. Further, the porous substrate to be used is limited to polytetrafluoroethylene and polyethylene capable of being made to be porous, and these polymers fail to meet the gas barrier property required for the electrolyte membranes for use in fuel cells, so that the above-mentioned property of the solid polymer electrolyte membrane thus obtained has been found to be insufficient in the light of the properties required for fuel cells.

DISCLOSURE OF THE INVENTION

An object of the present invention is to provide a functional membrane to be used in various applications and having high functionality in conjunction with the gas barrier property intrinsically possessed by a polymer film substrate, in particular, to provide a polymer electrolyte membrane optimal as a polymer electrolyte membrane for use in fuel cells, high in proton conductivity and excellent in gas barrier property.

The present inventors have reached the present invention by discovering that the above-mentioned problems can be solved by irradiating, under specific conditions, a film of a polymer such as polytetrafluoroethylene (PTFE) with heavy ions of such elements as C, K, N and He to generate active species in the above-mentioned polymer film, and by carrying out graft polymerization with the aid of the active species.

Specifically, a first aspect of the present invention is a production method of a functional membrane which method includes an ion irradiation step in which a polymer film substrate is irradiated with high energy heavy ions at $10^4$ to $10^{14}$ ions/cm$^2$, to generate active species in the film substrate, and a graft polymerization step in which after the ion irradiation step, the film substrate is added with one or more monomers selected from a group A consisting of monomers each having a functional group and 1 to 80 mol % of a monomer including a group B consisting of a crosslinking agent(s) for the group A monomer(s), and the film substrate and the monomer(s) are graft-polymerized, and consequently yields a functional membrane in which the functional groups are introduced only into the positions of the latent tracks formed by being damaged by ion irradiation. In this case, in the above-mentioned ion irradiation step, the latent tracks formed by being damaged by the high energy heavy ion irradiation may perforate the film.

According to the present invention, a polymer film substrate can be imparted with functionality by introducing functional groups only into the positions of the latent tracks formed in the polymer film substrate so as to have a pore size of a few hundred nm by being damaged by irradiation of high energy heavy ions, and consequently the physical properties of the individual polymer film substrate can be maintained unchanged and it also becomes possible to control the position, spatial distribution and density of the functional groups. As the physical properties possessed by the polymer film substrate, the gas barrier property and the dimensional stability may be mentioned.

When the latent tracks formed by being damaged by high energy heavy ion irradiation do not perforate the film, it is preferable to form through pores by etching. In this connection, an aspect of the present invention is a production method of a functional membrane, including: an ion irradiation step in which a polymer film substrate is irradiated with high energy heavy ions at $10^4$ to $10^{14}$ ions/cm$^2$, to form irradiation damages in the film substrate; an etching step in which after the ion irradiation step, the irradiation damages are subjected to chemical or thermal etching to form through pores having a cylindrical, conical, hand drum-shaped or funnel-shaped sectional form in the film substrate; and a graft polymerization step in which the perforated film substrate thus obtained is added with one or more monomers selected from the group A consisting of monomers each having a functional group and 1 to 80 mol % of a monomer including the group B consisting of a crosslinking agent(s) for the group A, and the monomer(s) is graft-polymerized only to the surface and pore wall of the film substrate by utilizing the active species still remaining in the positions of the latent tracks formed by being damaged by the ion irradiation or by utilizing active species newly generated by irradiation of any of radiation and plasma under vacuum or in an atmosphere of an inert gas.

According to the present invention, a polymer film substrate is irradiated with high energy heavy ions to form irradiation damages in the polymer film substrate, then the irradiation damages are subjected to chemical or thermal etching to form through pores in the film substrate to yield a perforated film substrate, and then functional groups are introduced only into the surface and pore wall of the perforated film substrate to enable to impart the film substrate with functionality; consequently, the physical properties of the individual polymer film substrate can be maintained unchanged, and it also becomes possible to control the position, spatial distribution and density of the functional groups, and to control the cylindrical, conical, hand drum-shaped and funnel-shaped sectional form.

When the active species remaining in the positions of the latent tracks are utilized, the monomer(s) is preferably graft-polymerized only to the pore wall of the through pores having pore sizes falling within a range from 1 to 250 nm. On the other hand, when the active species newly generated by irradiation of any of γ-ray, electron beam and plasma under vacuum or in the atmosphere of an inert gas are utilized, the monomer(s) is preferably graft-polymerized only to the pore wall of the through pores having pore sizes falling within a range from 1 nm to 5 μm and to the surface of the film substrate. In the graft polymerization step, it is possible that any of radiation and plasma is preirradiated and the monomer(s) is subjected to post-graft polymerization. Alternatively, it is possible that in the graft polymerization step, after the introduction of the monomer(s) into the film substrate, the monomer(s) is subjected to simultaneous graft polymerization while the irradiation of any of radiation and plasma is being conducted.

No particular constraint is imposed on the ion species of the high energy heavy ions to be irradiated in the ion irradiation step, and various ion species accelerated by a cyclotron or the like are used. Among these, heavy ions of one or more selected from C, N, O, Ne, Ca, Fe and Ar are irradiated, and these heavy ions can be made to reach the interior of a polymer film substrate having a large thickness to generate radicals.

By using C, N, O, Ne, Ca, Fe and Ar as the elements for the ions to be irradiated, as compared to the cases of the other elements such as Xe, the ranges of the ions in the polymer film substrate become larger by a factor of two or more. By using C, N, O, Ne, Ca, Fe and Ar as the elements of the ions to be irradiated, for example, even from a thick polymer film having a thickness of approximately 150 μm, an electrolyte membrane uniform in film quality is obtained by ion irradiation from one side of the film.

The radiation dose is preferably 1 to 100 kGy. Preferable examples of such radiation include one or more selected from γ-ray, X-ray and electron beam.

In the present invention, the temperature of the graft polymerization is preferably 10 to 80° C.

Additionally, an aspect of the present invention is a production method of a functional membrane including: an ion irradiation step in which a polymer film substrate is irradiated with a radiation of a does of 1 to 100 kGy, to generate active species in the film substrate; and a graft polymerization step in which after the ion irradiation step, the film substrate is added with one or more monomers selected from the group A consisting of monomers each having a functional group and 1 to 80 mol % of a monomer including the group B consisting of a crosslinking agent(s) for the group A monomer(s), and the film substrate and the monomer(s) are graft-polymerized.

Preferable examples of such radiation include one or more selected from γ-ray, X-ray and electron beam.

The polymer film substrate to be used in the present invention is preferably a polymer film substrate having an oxygen permeation coefficient of 10.0 [cc·mm/(m$^2$·day·atm)] or less at room temperature because such a polymer film substrate is excellent in gas barrier property and can attain the performance intrinsic to the polymer film substrate.

Preferable examples of the polymer film substrate include those made of ethylene-tetrafluoroethylene copolymer (ETFE) because when this copolymer is used for the polymer film substrate, radicals are generated cylindrically from the front side to the back side of the film substrate, functional groups are introduced into the positions of the generated radicals, and the film substrate can thereby be imparted with functionality. Because the functional groups are introduced cylindrically from the front side to the back side of the film substrate, the polymer film substrate thus processed is optimal for electrolyte membranes for use in fuel cells.

On the contrary, when the polymer film substrate includes a crystalline resin typified by polyvinylidene fluoride (PVDF), a three-layered structure is obtained in such a way that no functionality can be imparted to the front side and the back side of the film substrate because functional groups cannot be introduced into both sides, but functionality can be imparted only to the central portion of the film substrate by introducing functional groups thereinto. Such a three-layered structure can be used as various functional membranes.

The reason is not necessarily clear why an internal structure difference is created as described above between the case where ethylene-tetrafluoroethylene copolymer (ETFE) is used for the polymer film substrate and the case where a crystalline resin typified by polyvinylidene fluoride (PVDF) is used for the polymer film substrate. However, the reason is conceivably ascribable to the fact that with ethylene-tetrafluoroethylene copolymer (ETFE) the crystallinity of the film substrate is uniform from the surface to the interior thereof, but with a crystalline resin typified by polyvinylidene fluoride (PVDF) the crystallinity of the film substrate is different between the surface and the interior thereof.

Preferable is the case where the polymer film substrate and the one or more monomers selected from the group A consisting of monomers each having a functional group include the same types of elements because the graft chains do not penetrate into the polymer film substrate in the graft polymerization. For example, the following cases may be listed: a case where the polymer film substrate includes a hydrocarbon polymer and one or more monomers selected from the group A consisting of monomers each having a functional group include hydrocarbon monomers; a case where the polymer film substrate includes a fluorocarbon polymer and one or more monomers selected from the group A consisting of monomers each having a functional group include fluorocarbon monomers; and further, a case where the polymer film substrate includes a fluorocarbon polymer and one or more monomers selected from the group A consisting of monomers each having a functional group include hydrocarbon monomers.

In the graft polymerization step, one or more monomers selected from a group C consisting of functional monomers each having a molecular weight of 200 or more can be added. The functional monomer(s) having a molecular weight of 200 or more scarcely penetrates into the polymer film substrate during the graft polymerization and the functional groups can thereby be introduced only into the positions of the latent tracks.

In the graft polymerization step, one or more monomers selected from a group D consisting of monomers each having a functional group hardly graft-polymerizable can be added.

For the purpose of implementing the graft polymerization step, also preferably, after the ion irradiation step, the film substrate is brought into contact with a gas such as methane or hydrogen to eliminate the active species, and then the film substrate is irradiated with any of γ-ray, electron beam and plasma under vacuum or in the atmosphere of an inert gas to generate active species again.

For the polymer film substrate, a polymer film substrate having no crosslinked structure can be used, but when a polymer film substrate imparted with a crosslinked structure is used, desired strength and physical and chemical stabilities can be given to the polymer film substrate. For the polymer film substrate, various polymer materials can be used. Preferable among the polymer films made of such materials is any of a hydrocarbon polymer film, a fluorocarbon polymer film and a hydrocarbon/fluorocarbon polymer film.

A second aspect of the present invention is a functional membrane produced by the above-mentioned production methods. The second aspect is, for example, a functional membrane having pore sizes falling within a range from 1 nm to 5 μm and preferably from 1 nm to 250 nm based on a polymer film substrate having an oxygen permeation coefficient of 10.0 [cc·mm/(m$^2$·day·atm)] or less at room temperature.

Typical examples of the functional membrane of the present invention includes: a case where functional group-containing paths cylindrically perforate from the front side of the membrane to the back side of the membrane; and a case where the polymer film substrate includes a crystalline resin, the functional group-containing paths are mainly formed in a central layer of the polymer film substrate but neither in the vicinity of the front side of the membrane nor in the vicinity of the back side of the membrane, and thus the functional membrane as a whole has a three-layered structure. Needless to say, the present invention also includes such a case where a functional membrane has internal structure that cannot be strictly classified to either of these two cases.

The functional membrane having functional group-containing paths cylindrically penetrating from the front side of the membrane to the back side of the membrane can form functional group-containing paths definitely from the surface to the interior thereof, and hence is high in conductivity in the direction of the membrane thickness and effective as electrolyte membranes with suppressed dimensional variation and as the like. Additionally, in the functional membrane in which the polymer film substrate includes a crystalline resin, the functional group-containing paths are mainly formed in a central layer of the polymer film substrate but neither in the vicinity of the front side of the membrane nor in the vicinity of the back side of the membrane, and thus the functional membrane as a whole has a three-layered structure, so that the functional membrane can be made to be a three-layered membrane with layers deposited from the surface to the interior, and consequently, is effective for a three-layered functional separation membrane or the like free from interlayer delamination.

A third aspect of the present invention is a production method of an electrolyte membrane for use in a fuel cell, including: an ion irradiation step in which a polymer film substrate is irradiated with high energy heavy ions at $10^4$ to $10^{14}$ ions/cm$^2$ and perforated by the high energy heavy ions, to generate active species in the film substrate; and a graft polymerization step in which the film substrate is added with one or more monomers selected from the group A consisting of monomers each having a cation exchange group or a functional group convertible into a cation exchange group in a subsequent step, and the film substrate and the monomer(s) are graft-polymerized.

For the purpose of implementing the graft polymerization step, also preferably, after the ion radiation step, the film substrate is brought into contact with a gas such as methane or hydrogen to eliminate the active species, and then the film substrate is irradiated with any of γ-ray, electron beam and plasma under vacuum or in the atmosphere of an inert gas to generate active species again.

Additionally, in the production method of an electrolyte membrane for use in a fuel cell of the present invention, in place of the above-mentioned operation that the polymer film substrate is irradiated with high energy heavy ions at $10^4$ to $10^{14}$ ions/cm$^2$ so as to be perforated by the high energy heavy ions, the perforation may be made by chemical or thermal etching. In this case, the present invention include: an ion irradiation step in which a polymer film substrate is irradiated with high energy heavy ions at $10^4$ to $10^{14}$ ions/cm$^2$, to form irradiation damages in the film substrate; an etching step in which after the ion irradiation step, the irradiation damages are subjected to chemical or thermal etching to form through pores having a cylindrical, conical, hand drum-shaped or funnel-shaped sectional form in the film substrate; and a graft polymerization step in which the perforated film substrate thus obtained is added with one or more monomers selected from the group A consisting of monomers each having a functional group and 1 to 80 mol % of a monomer including the group B consisting of a crosslinking agent(s) for the group A, and the monomer(s) is graft-polymerized only to the surface and pore wall of the film substrate by utilizing the active species still remaining in the positions of the latent tracks formed by being damaged by the ion irradiation or by utilizing active species newly generated by irradiation of any of radiation and plasma under vacuum or in the atmosphere of an inert gas.

Further, the production method of an electrolyte membrane for use in a fuel cell of the present invention include: an ion irradiation step in which a polymer film substrate is irradiated with a radiation of a does of 1 to 100 kGy, to generate active species in the film substrate; and a graft polymerization step in which after the ion irradiation step, the film substrate is added with one or more monomers selected from the group A consisting of monomers each having a functional group and 1 to 80 mol % of a monomer including the group B consisting of a crosslinking agent(s) for the group A monomer(s), and the film substrate and the monomer(s) are graft-polymerized.

As described above, when C, N, O, Ne, Ca, Fe and Ar are used as the elements of the ions to be irradiated, even in a polymer film substrate having a large thickness, radicals can be generated uniformly.

According to the production method of an electrolyte membrane for use in a fuel cell of the present invention, the polymer film substrate can be imparted with ion exchange ability by introducing cation exchange functional groups only into the positions of irradiation damages, perforating in the thickness direction, formed by irradiating the polymer film substrate with high energy heavy ions. Thus, the production method of an electrolyte membrane for use in a fuel cell of the present invention has the following features:

(A) The porosity is small, and hence the physical properties possessed by an individual polymer film substrate can be maintained unchanged.

(B) The position, spatial distribution and density of the functional groups can be controlled.

(C) The packing amount of an ion exchange resin is small, and hence the swelling due to hydration can be suppressed.

Further, owing to the use of an ion irradiation method, the production method of an electrolyte membrane for use in a fuel cell of the present invention can be applied to all the polymer materials capable of forming films without sticking to existing porous substrates. Thus, the following feature is to be added.

(D) The control of the physical properties, namely, the proton conductivity and the gas barrier property of an ion exchange membrane can be easily carried out.

Preferable as the polymer film substrate to be used in the present invention is a polymer film substrate having an oxygen permeation coefficient of 10.0 [cc·mm/(m$^2$·day·atm)] or less at room temperature, because such a polymer film substrate is excellent in gas barrier property and capable of exhibiting the performance intrinsic to the polymer film substrate, and is permeable to protons but blocks gas when used in a fuel cell so as to exhibit excellent electric power generation performance.

Also preferably, the perforated film substrate obtained in the etching step is added with one or more monomers selected from the group A consisting of monomers each having a cation exchange group or a functional group convertible into a cation exchange group in a subsequent step, and the electrolyte membrane for use in a fuel cell is obtained by graft-polymerizing the monomer(s) only to the surface and pore wall of the film substrate to introduce the functional groups into the film substrate by utilizing the active species still remaining in the positions of the latent tracks formed by being damaged by the ion irradiation or by utilizing active species newly generated by irradiation of any of radiation and plasma under vacuum or in the atmosphere of an inert gas.

Preferably, for the purpose of forming cation exchange group-containing paths within a limited range, in the graft polymerization step, one or more monomers including the group B consisting of a crosslinking agent(s) for the group A are added in an amount up to a maximum value of 80 mol %.

For the polymer film substrate, a polymer film substrate having no crosslinked structure can be used, but when a polymer film substrate imparted with a crosslinked structure is used, desired strength, and physical and chemical stabilities can be given to the polymer film substrate. For the polymer film substrate, various polymer materials can be used. Preferable among the polymer films made of such materials is any of a hydrocarbon polymer film, a fluorocarbon polymer film and a hydrocarbon/fluorocarbon polymer film.

In the present invention, the graft ratio is preferably 50% or less and particularly preferably 20% or less.

When the active species remaining in the positions of the latent tracks are utilized, the monomer(s) is preferably graft polymerized only to the pore wall of the through pores having pore sizes falling within a range up to a maximum value of 250 nm.

Also, when the active species newly generated by irradiation of any of radiation and plasma under vacuum or in the atmosphere of an inert gas are utilized, the monomer(s) is preferably graft polymerized to the pore wall of the through pores having pore sizes falling within a range up to a maximum value of 1 μm. Particularly preferably, the monomer(s) is graft polymerized to introduce the cation exchange group, and consequently all the through pores are in a state of being filled with the cation exchange groups, and no cation exchange group is introduced into the interior of the film substrate.

In the graft polymerization step, one or more monomers selected from the group C consisting of monomers each having a molecular weight of 200 or more and having a cation exchange group or a functional group convertible to a cation exchange group in a subsequent step can be added. The functional monomer(s) having a molecular weight of 200 or more scarcely penetrates into the polymer film substrate during the graft polymerization and the functional groups can thereby be introduced only into the positions of the latent tracks.

In the production method of an electrolyte membrane for use in a fuel cell of the present invention, various polymer film substrates can be combined with various monomers. Among such combinations, when the polymer film substrate includes ethylene-tetrafluoroethylene copolymer (ETFE), the cation exchange group-containing paths cylindrically perforating from the front side of the polymer film substrate to the back side of the polymer film substrate can be formed, and the polymer film substrate thus processed is preferable as electrolyte membranes for use in fuel cells.

A fourth aspect of the present invention is an electrolyte membrane for use in a fuel cell produced by any one of the above-mentioned production methods. The fourth aspect is, for example, an electrolyte membrane for use in a fuel cell which has cation exchange group-containing paths having pore sizes falling within a range from 1 nm to 5 μm and preferably from 1 nm to 250 nm in a polymer film substrate having an oxygen permeation coefficient of 10.0 [cc·mm/(m$^2$·day·atm)] or less at room temperature.

The functional membrane of the present invention can be imparted with functionality by introducing functional groups only into the positions of the latent tracks formed in a polymer film substrate by being damaged by the irradiation of high energy heavy ions or 1 to 100 kGy of radiation, and hence can maintain the physical properties of the polymer film substrate unchanged. Alternatively, the functional membrane of the present invention can be imparted with functionality by introducing only into the surface and pore wall of the perforated film substrate obtained by forming through pores having a cylindrical, conical, hand drum-shaped or funnel-shaped sectional form in the film substrate by chemically or thermally etching the irradiation damages having been formed by irradiation of the polymer film substrate with high energy heavy ions, and hence can maintain the physical properties of the polymer film substrate unchanged. In particular, when C, N, O, Ne, Ca, Fe and Ar are used as the elements of the ions to be irradiated, even in a polymer film substrate having a large thickness, radicals can be generated uniformly to yield a uniform functional membrane large in thickness.

BEST MODE FOR CARRYING OUT THE INVENTION

No particular constraint is imposed on the polymer film substrate usable in the present invention. Examples of such polymer film substrate include hydrocarbon polymer films good in permeability to monomer solutions. Additionally, fluorine-containing polymer films are poor in permeability to monomer solutions; however, ion irradiation makes monomers penetrate into the interior of the film, and thus promotes the graft reaction in the interior of the film.

Specific examples of the polymer film substrates that may be used include the polymer film substrates made of the following ultrahigh molecular weight polymers: polyethylene, polypropylene, polystyrene, polyamide, aromatic polyamide, polyethylene terephthalate, polyethylene naphtalate, polycarbonate, polyetherketone, polyetheretherketone, polyethersulfone, polyphenylenesulfide and polysulfone.

Specific examples of the film substrates that may also be used include the film substrates made of polyimide polymers such as polyimide, polyetherimide, polyamideimide, polybenzoimidazole and polyetheretherimide.

Further, specific examples of the film substrates that may also be used include the film substrates made of polyvinylidene fluoride (PVDF), ethylene-tetrafluoroethylene copolymer (ETFE), polytetrafluoroethylene, tetrafluoroethylene-hexafluoropropylene copolymer and tetrafluoroethylene-perfluoroalkylvinyl ether copolymer.

Among these film substrates, each of the fluorine-containing films undergoes, when crosslinked, formation of crosslinked structure in the polymeric structure thereof to increase the graft ratios of the monomers, and the heat resistance thereof is thereby increased, so that the film strength decrease thereof due to irradiation can be suppressed. Therefore, it is preferable to use a crosslinked film for the purpose of producing fuel cells to display high performances in high temperature applications. For example, the present inventors have already found that when styrene is used as a graft monomer, the graft ratio can be remarkably increased for crosslinked polytetrafluoroethylene as compared to that for non-crosslinked polytetrafluoroethylene in such a way that the sulfonic acid groups can be introduced into crosslinked polytetrafluoroethylene 2 to 10 times more than into non-crosslinked polytetrafluoroethylene.

From these facts, in the present invention, it is preferable to use polymer film substrates made of the following ultrahigh molecular weight polymers having crosslinked structure, in place of the polyethylene terephthalate film substrate: polyethylene, polypropylene, polystyrene, polyamide, aromatic polyamide, polyethylene terephthalate, polyethylene naphthalate, polycarbonate, polyetherketone, polyetheretherketone, polyethersulfone, polyphenylenesulfide and polysulfone.

Also preferable are the polymer film substrates made of the following polymers having crosslinked structure: polyimide, polyetherimide, polyamideimide, polybenzoimidazole and polyetheretherimide. Similarly preferable are the polymer film substrates made of the following polymers having crosslinked structure: polyvinylidene fluoride, ethylene-tetrafluoroethylene copolymer, polytetrafluoroethylene, tetrafluoroethylene-hexafluoropropylene copolymer and tetrafluoroethylene-perfluoroalkylvinyl ether copolymer.

In the present invention, the polymer film substrate is irradiated with high energy heavy ions with a cyclotron accelerator or the like. It is to be noted that the heavy ions as referred to herein mean ions equal in mass to or larger in mass than carbon ions. The irradiation with such ions generates irradiation damages due to ion irradiation in the polymer film. The irradiation damage area depends on the mass and energy of the irradiated ions; it has been known that the irradiation damage area has an extension of approximately one nano meter to a few hundred nano meters in size per one ion (H. Kudo and Y. Morita, J. Polym. Sci., Part B, Vol. 39, 757-762 (2001)).

Ions are recommended to be irradiated at the number of the ions of the order of $10^4$ to $10^{14}$ ions/cm$^2$ so that the irradiation damage areas due to the individual ions may not overlap each other. Irradiation is recommended to be conducted while the high energy ions are being scanned under the conditions that a 10 cm×10 cm film substrate, for example, is fixed on an irradiation stage disposed in an irradiation chamber connected to a cyclotron accelerator or the like, and the interior of the irradiation chamber is drawn to a vacuum of $10^{-6}$ Torr or lower. The irradiation amount can be determined from the current magnitude of the ion current beforehand measured with a high precision ammeter and the irradiation time. It is recommended that the types of the high energy heavy ions to be irradiated are preferably of the ions each having a mass equal to or larger than that of a carbon ion and capable of being actually accelerated by an accelerator.

The ion species such as carbon, nitrogen, oxygen, neon, argon, krypton and xenon ions are more preferable because of the easiness in generation of these ions and the easiness in handling these ions. Alternatively, for the purpose of increasing the irradiation damage area per one ion, heavy mass ions such as gold ions, bismuth ions or uranium ions may be used. The ion energy depends on the ion species, and has only to be enough to make the ions penetrate in the thickness direction through the polymer film substrate. For a 50 μm thick polyethylene terephthalate film substrate, for example, the ion energy is required to be 40 MeV or more for carbon ions, 80 MeV or more for Neon ions and 180 MeV or more for argon ions; for a 100 μm thick polyethylene terephthalate film substrate, the ion energy is required to be 62 MeV or more for carbon ions, 130 MeV or more for Neon ions and 300 MeV or more for argon ions. Xenon ions of 450 MeV can penetrate through a 40 µm thick film substrate, and uranium ions of 2.6 GeV can penetrate through a 120 µm thick film substrate.

Even when the range of the ions to be used for irradiation is approximately half the thickness of the film substrate, there can be created a distribution of the irradiation damage areas varying from the surface of the film toward the interior of the film, either by irradiation from both sides of the film with the same type of ions or different types of ions in varied irradiation amounts or by irradiation from both sides of the film with a combination of lighter ions having long ranges and heavier ions having short ranges. In the graft reaction to be described below, such a distribution gives rise to graft chains different in amount and length, and polymeric structures different in morphology in the film. On the basis of these results, by utilizing the variation of the distribution of the sulfonic acid groups in the graft chains in a film substrate, the water content distribution in the film substrate and the permeability of the film to fuel gas can be controlled.

In the case of heavy ions, ions having such extremely high energies as described above are required to penetrate thorough the thickness of the film. For example, the range of carbon ions of 22 MeV in the polyethylene terephthalate film substrate is approximately 25 µm, so that the carbon ions cannot be made to penetrate through this 50 µm thick film substrate; in order to penetrate through the 50 µm thick polyethylene terephthalate film substrate, the ions are required to have an energy of approximately 40 MeV, but carbon ions of 22 MeV are sufficient in the irradiation from both sides of the film. For the purpose of generating higher energy ions, a larger-size accelerator is required, and hence the equipment cost is raised greatly. Also from this reason, the ion radiation from both sides is extremely effective for the production of ion exchange membranes in the present invention.

In this connection, by irradiating heavy ions of one or more elements selected from C, N, O, Ne, Ca, Fe and Ar, these heavy ions can be made to reach even the interior of a polymer film substrate having a large thickness to generate radicals. By using C, N, O, Ne, Ca, Fe and Ar as the elements for the ions to be irradiated, as compared to the cases of the other elements such as Xe, the ranges of the ions in the polymer film substrate become larger by a factor of two or more. For the purpose of obtaining an electrolyte membrane uniform in quality in the thickness direction, a polymer film substrate having a thickness of approximately 30 µm or less is used. When a polymer film substrate having a thickness equal to or larger than this thickness is used, irradiation to both sides is required to obtain a uniform electrolyte membrane. By using C, N, O, Ne, Ca, Fe and Ar as the elements for the ions to be irradiated, for example, even a thick polymer film having a thickness of approximately 150 µm can yield an electrolyte membrane uniform in membrane quality by ion irradiation from one side. Consequently, it becomes possible to obtain an electrolyte membrane small in cross leak and to attain simplification of the production process and reduction of the equipment cost.

For the purpose of obtaining a membrane high in functionalities such as ion exchange capability, the irradiation amount of ions has only to be increased. When the irradiation amount is large, the film substrate tends to be degraded, and the irradiation damage areas tend to overlap each other to degrade the below-described graft efficiency of the monomer. On the other hand, when the irradiation amount is small, the graft amount of the monomer becomes small and consequently no sufficient ion exchange capacity can be obtained. From these reasons, the ion irradiation density is preferably set to fall within a range from $10^4$ to $10^{14}$ ions/cm$^2$.

The "one or more monomers selected from the group A consisting of monomers each having a functional group" to be used in the present invention mean not only the monomers themselves each having a functional group, but the monomers each having a group to be converted into a functional group by the reaction in a subsequent step.

In the present invention, a functional membrane is produced as follows: a polymer film substrate having been irradiated with heavy ions is added with one or more monomers listed below as examples, degassed and then heated to graft polymerize the monomer(s), and further the sulfonyl halide groups [—SO$_2$X$^1$], the sulfonic acid ester groups [—SO$_3$R$^1$] or the halogen groups [—X$^2$] in the graft molecular chains are converted into sulfonic acid groups [—SO$_3$H] to produce the functional membrane. Alternatively, the functional membrane can be produced by introducing sulfonic acid groups with the aid of chlolosulfonic acid into the phenyl groups, ketone groups, ether groups and the like present in the hydrocarbon monomer units within the graft chains. In the present invention, the monomers in the group A to be graft polymerized to a film substrate are typified by the monomers shown in the following (1) to (6).

(1) One or more monomers selected from the group consisting of monomers each having a sulfonyl halide group, namely, CF$_2$=CF(SO$_2$X$^1$) (in this formula, X$^1$ represents a halogen group, namely, —F or —Cl; the same hereinafter), CH$_2$=CF(SO$_2$X$^1$), and CF$_2$=CF(OCH$_2$(CF$_2$)$_m$SO$_2$X$^1$) (in this formula, m is 1 to 4; the same hereinafter).

(2) One or more monomers selected from the group consisting of monomers each having a sulfonic acid ester group, namely, CF$_2$=CF(SO$_3$R$^1$) (in this formula, R$^1$ represents an alkyl group, namely, —CH$_3$, —C$_2$H$_5$ or —C(CH$_3$)$_3$; the same hereinafter), CH$_2$=CF(SO$_3$R$^1$) and CF$_2$=CF(OCH$_2$(CF$_2$)$_m$SO$_3$R$^1$).

(3) One or more monomers selected from the group consisting of CF$_2$=CF(O(CH$_2$)$_m$X$^2$) (in this formula, X$^2$ represents a halogen group, namely, —Br or —Cl; the same hereinafter) and CF$_2$=CF(OCH$_2$(CF$_2$)$_m$X$^2$).

(4) One or more monomers selected from the group consisting of acrylic monomers, namely, CF$_2$=CR$^2$(COOR$^3$) (in this formula, R$^2$ represents —CH$_3$ or —F, R$^3$ represents —H, —CH$_3$, —C$_2$H$_5$ or —C(CH$_3$)$_3$; the same hereinafter) and CH$_2$=CR$^2$(COOR$^3$).

(5) One or more monomers selected from the group consisting of styrene and styrene derivative monomers, namely, 2,4-dimethylstyrene, vinyltoluene and 4-tert-butylstyrene.

(6) One or more monomers selected from the group consisting of acenaphthylene, vinylketones CH$_2$=CH(COR$^4$) (in this formula, R$^4$ represents —CH$_3$, —C$_2$H$_5$ or a phenyl group (—C$_6$H$_5$)) and vinylethers CH$_2$=CH(OR$^5$) (in this formula, R$^5$ represents —C$_n$H$_{2n+1}$ (n=1 to 5), —CH(CH$_3$)$_2$, —C(CH$_3$)$_3$ or a phenyl group).

Specific examples of "the monomer including the group B consisting of a crosslinking agent(s) for the group A monomer(s)" to be used in the present invention include divinylbenzene, triallyl cyanurate, triallyl isocyanurate, 3,5-bis(trifluorovinyl)phenol and 3,5-bis(trifluorovinyloxy)phenol. One or more of these crosslinking agents are added in an amount of 30 mol % or less in relation to the total amount of the monomers, and then the graft polymerization is carried out.

"The one or more monomers selected from the group C consisting of functional monomers each having a molecular weight of 200 or more" to be used in the present invention mean the monomer(s) having a molecular weight of 200 or more among the monomers in the group A.

"The one or more monomers selected from the group D consisting of monomers each having a functional group hardly graft-polymerizable" to be used in the present invention are typified by the perfluorovinyl monomers shown in (1) to (3) among the above-mentioned monomers of the group A. These monomers are listed below once more.

(1) One or more monomers selected from the group consisting of monomers each having a sulfonyl halide group, namely, $CF_2=CF(SO_2X^1)$ (in this formula, $X^1$ represents a halogen group, namely, —F or —Cl; the same hereinafter), $CH_2=CF(SO_2X^1)$, and $CF_2=CF(OCH_2(CF_2)_mSO_2X^1)$ (in this formula, m is 1 to 4; the same hereinafter).

(2) One or more monomers selected from the group consisting of monomers each having a sulfonic acid ester group, namely, $CF_2=CF(SO_3R^1)$ (in this formula, $R^1$ represents an alkyl group, namely, —$CH_3$, —$C_2H_5$ or —$C(CH_3)_3$; the same hereinafter), $CH_2=CF(SO_3R^1)$ and $CF_2=CF(OCH_2(CF_2)_mSO_3R^1)$.

(3) One or more monomers selected from the group consisting of $CF_2=CF(O(CH_2)_mX^2)$ (in this formula, $X^2$ represents a halogen group, namely, —Br or —Cl; the same hereinafter) and $CF_2=CF(OCH_2(CF_2)_mX^2)$.

EXAMPLES

Hereinafter, Examples and Comparative Examples of the present invention will be presented.

Examples 1 to 5, Examples 8 and 9

For the substrates (sample film), polyvinylidene fluoride (hereinafter, abbreviated to as PVDF) film was used. The studied monomers and the relevant compositions are as shown in Table 1 presented below.

The preparation steps for each of the samples are as follows.

(1) A sample film was irradiated with Xe heavy ions or Au heavy ions accelerated by a cyclotron. The ion irradiation density (fluence) was controlled according to the irradiation time.

(2) The sample was taken out from the irradiation chamber into the air and immersed in the monomer solution shown in Table 1.

(3) The monomer solution was heated to 60° C. and the polymerization was allowed to proceed for a polymerization time of 24 hours.

(4) The sample was taken out and immersed in a toluene, and the solution was heated to 60° C. to remove homopolymers.

(5) The sample was dried in a vacuum drying furnace.

(6) The sample was immersed in a 0.2 mol/l 1,2-dichloroethane solution of chlorosulfonic acid, and allowed to stand at approximately 2° C. for 24 hours to carry out the sulfonation of St.

(7) The sample was immersed in pure water to undergo hydrolysis (the operation was repeated until the immersing solution became neutral).

(8) The sample was dried in the vacuum drying furnace.

Examples 6 and 7

For the substrates (sample film), PVDF film was used. The studied monomers and the relevant compositions are as shown in Table 1 presented below.

(1) A sample film was irradiated with Xe heavy ions or Au heavy ions accelerated by a cyclotron. The ion irradiation density (fluence) was controlled according to the irradiation time (the same as in Examples 1 to 5).

(2) The sample was taken out from the irradiation chamber into the air, subjected to etching under the alkali treatment conditions shown in Table 1, and then immersed in the monomer solution shown in Table 1 presented below.

(3) The monomer solution was heated to 60° C. and the polymerization was allowed to proceed for a polymerization time of 24 hours.

(4) to (8) The same as in Examples 1 to 5.

Example 10

For the substrate (sample film), polyvinylidene fluoride (PVDF) film was used, and PVDF was subjected to γ-ray irradiation at the dose shown in Table 1 to prepare crosslinked PVDF. The studied monomers and the relevant composition are as shown in Table 1 presented below.

(1) to (8) The same as in Examples 1 to 5.

Example 11

For the substrate (sample film), nylon NMXD6 (hereinafter referred to as NMXD6) film was used. The studied monomer and the relevant composition are as shown in Table 1 presented below.

(1) The same as in Examples 1 to 5.

(2) The sample was taken out from the irradiation chamber into the air, and immersed in an aqueous solution (20 mass %) of sodium styrenesulfonate.

(3) The aqueous solution was heated to 40° C. and the polymerization was allowed to proceed for a polymerization time of 24 hours.

(4) The sample was taken out and immersed in pure water to be washed.

(5) The same as in Examples 1 to 5.

(6) The sample was immersed in a 1 mol/l aqueous solution of HCl and allowed to stand at approximately 50° C. for 24 hours to be subjected to a protonation treatment.

(7) The sample was immersed in pure water to be washed (the operation was repeated until the immersing solution became neutral).

(8) The same as in Examples 1 to 5.

Examples 12 and 13

For the substrates (sample film), polyimide (hereinafter abbreviated as PI) film and polyparaphenylene terephthalamide (hereinafter abbreviated as PPTA) film were used. The studied monomers and the relevant compositions are as shown in Table 1 presented below.

(1) to (8) The same as in Examples 1 to 5.

Example 14

For the substrate, PPTA was used. The studied monomers and the relevant composition are as shown in Table 1 presented below.

(1) A sample film was irradiated with Xe heavy ions or Au heavy ions accelerated by a cyclotron. The ion irradiation density (fluence) was controlled according to the irradiation time.

(2) The sample was taken out from the irradiation chamber into the air, subjected to etching under the treatment conditions shown in Table 1, and then immersed in the monomer solution shown in Table 1 presented below.

(3) The monomer solution was heated to 60° C. and polymerization was allowed to proceed for a polymerization time of 24 hours.

(4) to (8): The same as in Examples 1 to 5.

Comparative Example 1

For the substrate (sample film), PVDF film was used. The studied monomer and the relevant composition are as shown in Table 1 presented below.

(1) to (8) The same as in Examples 1 to 5.

Comparative Example 2

For the substrate (sample film), commercial Nafion 112 film was used for comparison.

The conductivity evaluation was carried out in the following manner. Each of the fuel cells was subjected to the internal resistance measurement under the electric power generation condition of the fuel cell by means of the alternating current impedance method, and thus the conductivity of the membrane was derived. The hydrogen gas permeability measurement was conducted at 80° C. and 90% RH. The results thus obtained are shown in Table 1 presented below.

It is to be noted that *1 to *11 in Table 1 mean as follows.

As can be seen from the results shown in Table 1, the samples prepared in Examples 1 to 14 of the present invention compare favorably in conductivity with and are markedly superior in gas barrier property to Nafion (trade name) having been hitherto widely used.

Examples 15 to 18

(1) For the substrates (sample film), nylon NMXD6 film was used.

(2) The $^{60}$Co γ-ray was irradiated at 5 kGy (Example 15), 10 kGy (Example 16), 30 kGy (Example 17) and 60 kGy (Example 18), respectively.

(3) The samples were immersed in an aqueous solution (20 mass %) of sodium styrenesulfonate, and then the solution was heated to 30° C. and the graft polymerization was allowed to proceed.

(4) The graft polymerization ratio of each of the membranes thus obtained was examined.

TABLE 1

| | Substrate | Pre-crosslinking | Ion irradiation density (fluence) [ions/cm$^2$] | Ion species | Ion energy [eV] | Etching treatment | Monomer species (Group A) | Monomer species (Group B) |
|---|---|---|---|---|---|---|---|---|
| Ex. 1 | PVDF | None | $3 \times 10^8$ | Xe | 450M | None | *2 | *5 |
| Ex. 2 | | | $3 \times 10^8$ | Xe | 450M | None | *2 | *5 |
| Ex. 3 | | | $3 \times 10^8$ | Xe | 450M | None | *2 | *6 |
| Ex. 4 | | | $3 \times 10^8$ | Xe | 450M | None | | |
| Ex. 5 | | | $3 \times 10^8$ | Xe | 450M | None | | |
| Ex. 6 | | | $3 \times 10^7$ | Xe | 450M | Applied *1 | *2 | *5 |
| Ex. 7 | | | $3 \times 10^7$ | Au | 2.2 G | Applied *11 | *2 | *5 |
| Ex. 8 | | | $3 \times 10^9$ | Xe | 450M | None | *2 | *5 |
| Ex. 9 | | | $3 \times 10^9$ | Xe | 450M | None | *2 | *6 |
| Ex. 10 | | Applied (500kGy) | $3 \times 10^8$ | Xe | 450M | None | *2 | *5 |
| Ex. 11 | NMXD6 | None | $3 \times 10^8$ | Xe | 450M | None | *3 | |
| Ex. 12 | PI | None | $3 \times 10^8$ | Xe | 450M | None | *4 | *5 |
| Ex. 13 | PPTA | None | $3 \times 10^8$ | Xe | 450M | None | *4 | *5 |
| Ex. 14 | PPTA | None | $3 \times 10^8$ | Au | 2.2 G | Applied *10 | *4 | *5 |
| Comp. Ex. 1 | PVDF | None | $3 \times 10^8$ | Xe | 450M | None | St | |
| Comp. Ex. 2 | | Commercial membrane (Nafion112) | | | | | | |

| | Monomer species (Group C) | Monomer species (Group D) | Monomer ratio (group A/group B) (molar ratio) | Graft ratio [wt %] | Conductivity [S/cm] @80° C., 90% RH | Hydrogen permeability [cc * mm/ (m$^2$, day, atm)] |
|---|---|---|---|---|---|---|
| Ex. 1 | | | 95/5 | 1.6 | 0.02 | 6.4E+02 |
| Ex. 2 | | | 95/5 | 7.1 | 0.08 | 1.5E+03 |
| Ex. 3 | | | *9 | 21.1 | 0.21 | 3.1E+03 |
| Ex. 4 | *7 | | | 6.9 | 0.08 | 1.7E+03 |
| Ex. 5 | | *8 | | 6.8 | 0.08 | 1.6E+03 |
| Ex. 6 | | | 95/5 | 8.3 | 0.10 | 1.6E+03 |
| Ex. 7 | | | 95/5 | 9.1 | 0.21 | 3.2E+03 |
| Ex. 8 | | | 95/5 | 9.0 | 0.11 | 1.7E+03 |
| Ex. 9 | | | *9 | 20.4 | 0.20 | 3.0E+03 |
| Ex. 10 | | | 95/5 | 7.9 | 0.09 | 1.3E+03 |
| Ex. 11 | | | | 15.1 | 0.12 | 1.9E+03 |
| Ex. 12 | | | 95/5 | 11.1 | 0.11 | 1.5E+03 |
| Ex. 13 | | | 95/5 | 9.9 | 0.09 | 1.2E+03 |
| Ex. 14 | | | 95/5 | 15.6 | 0.13 | 2.1E+03 |
| Comp. Ex. 1 | | | | 7.2 | 0.04 | 4.5E+03 |
| Comp. Ex. 2 | | | | | 0.08 | 1.1E+04 |

(5) Each of the membranes thus obtained was embedded in a resin, a section of the thus embedded membrane was exposed, and then the section thus obtained was analyzed by means of EPMA; from the distribution picture of sulfur (S) thus obtained, whether the membrane was uniform or nonuniform was judged.

(6) The results thus obtained are as shown in Table 2; as can be seen from Table 2, when the irradiation dose was increased, the reaction was concentrated (nonuniform) on the membrane surface.

Examples 19 to 22

(1) For the substrates (sample film), nylon NMXD6 film was used.

(2) The $^{60}$Co γ-ray was irradiated at 5 kGy (Example 19), 10 kGy (Example 20), 30 kGy (Example 21) and 60 kGy (Example 22), respectively.

(3) The samples were immersed in an aqueous solution (20 mass %) of sodium styrenesulfonate, and then the solution was heated to 40° C. and the graft polymerization was allowed to proceed.

(4) The graft polymerization ratio of each of the membranes thus obtained was examined.

(5) Each of the membranes was embedded in a resin, a section of the thus embedded membrane was exposed, and then the section thus obtained was analyzed by means of EPMA; from the distribution picture of sulfur (S) thus obtained, whether the membrane was uniform or nonuniform was judged.

(6) The results thus obtained are as shown in Table 2; as can be seen from Table 2, when the irradiation dose was increased, the reaction was concentrated (nonuniform) on the membrane surface.

TABLE 2

| Irradiation dose | Temperature | |
|---|---|---|
| (kGy) | 30° C. | 40° C. |
| 5 | Uniform (99 wt %) | Uniform (76 wt %) |
| 10 | Nonuniform (106 wt %) | Uniform (80 wt %) |
| 30 | Nonuniform (59 wt %) | Uniform (93 wt %) |
| 60 | Nonuniform (35 wt %) | Nonuniform (54 wt %) |

Examples 23 to 25

(1) For the substrates (sample film), nylon NMXD6 film was used.

(2) The $^{60}$Co γ-ray was irradiated at 5 kGy.

(3) The samples were immersed in an aqueous solution (20 mass %) of sodium styrenesulfonate.

(4) The solution was heated to 30° C. (Example 23), 40° C. (Example 24) and 50° C. (Example 25), respectively, and the graft polymerization was allowed to proceed.

(5) The graft polymerization ratio of each of the membranes thus obtained was examined.

(6) Each of the membranes thus obtained was embedded in a resin, a section of the thus embedded membrane was exposed, and then the section thus obtained was analyzed by means of EPMA and the distribution of sulfur (S) was examined.

(7) The results thus obtained are as shown in Table 3 presented below.

Examples 26 to 28

(1) For the substrates (sample film), nylon NMXD6 film was used.

(2) The $^{60}$Co γ-ray was irradiated at 10 kGy.

(3) The samples were immersed in an aqueous solution (20 mass %) of sodium styrenesulfonate.

(4) The solution was heated to 30° C. (Example 26), 40° C. (Example 27) and 50° C. (Example 28), respectively, and the graft polymerization was allowed to proceed.

(4) The graft polymerization ratio of each of the membranes thus obtained was examined.

(5) Each of the membranes thus obtained was embedded in a resin, a section of the thus embedded membrane was exposed, and then the section thus obtained was analyzed by means of EPMA and the distribution of sulfur (S) was examined.

(6) The results thus obtained are as shown in Table 3 presented below; as can be seen from Table 3, when the temperature was decreased, the reaction was concentrated (nonuniform) on the membrane surface.

TABLE 3

| | Irradiation doses | |
|---|---|---|
| Temperature (° C.) | 5 kGy | 10 kGy |
| 30 | Uniform (99 wt %) | Nonuniform (106 wt %) |
| 40 | Uniform (76 wt %) | Uniform (80 wt %) |
| 50 | Uniform (51 wt %) | Uniform (64 wt %) |

Example 29

(1) For the substrate (sample film), nylon NMXD6 (NMXD6) film was used.

(2) A sample film was irradiated with Xe ions accelerated by a cyclotron.

(3) Ion irradiation was carried out at an ion irradiation density (fluence) set at $3 \times 10^8$ (ions/cm$^2$).

(4) The sample was taken out from the irradiation chamber into the air.

(5) The sample was immersed (40° C.×12 h) in an aqueous solution of sodium hypochlorite (NaClO) adjusted to pH 9 to be subjected to etching treatment.

(7) The $^{60}$Co γ-ray was irradiated at 60 kGy.

(8) The sample was immersed in an aqueous solution (20 mass %) of sodium styrenesulfonate.

(9) The solution was heated to 30° C. and the graft polymerization was allowed to proceed.

(10) The graft polymerization ratio of the membrane thus obtained was examined.

(11) The membrane thus obtained was embedded in a resin, a section of the thus embedded membrane was exposed, and then the section thus obtained was analyzed by means of EPMA and the distribution of sulfur (S) was examined.

(12) Consequently, it was found that the reaction was concentrated (nonuniform) in the etched portions and the surface of the membrane.

Example 30

(1) For the substrate (sample film), a 50 μm thick polyvinylidene fluoride (PVDF) film was used.

(2) The sample film was irradiated with Ar ions of 460 MeV, accelerated by a cyclotron.

(3) Ion irradiation was carried out at an ion irradiation density (fluence) set at $3 \times 10^9$ (ions/cm$^2$).

(4) The sample film was taken out from the irradiation chamber into the air, and then immersed in a solution (100%) of St.

(5) The solution was heated to 60° C., and the polymerization was allowed to proceed for a polymerization time of 24 hours.

(6) The sample film was taken out and immersed in a toluene solution; the toluene solution was heated to 60° C. to remove the homopolymers.

(7) The sample film was dried in a vacuum drying furnace.

(8) The weight of the sample film was measured to derive the graft ratio. Here, it is to be noted that the graft ratio (mass %)=(weight increment after grafting)/(weight before grafting)

(9) The graft ratio was found to be 15.0%.

Example 31

(1) For the substrate (sample film), a 100 μm thick polyvinylidene fluoride (PVDF) film was used.

(2) The sample film was irradiated with Ar ions of 460 MeV, accelerated by a cyclotron.

(3) Ion irradiation was carried out at an ion irradiation density (fluence) set at $3\times10^9$ (ions/cm$^2$).

(4) The sample film was taken out from the irradiation chamber into the air, and then immersed in a solution (100%) of St.

(5) The solution was heated to 60° C., and the polymerization was allowed to proceed for a polymerization time of 24 hours.

(6) The sample film was taken out and immersed in a toluene solution; the toluene solution was heated to 60° C. to remove the homopolymers.

(7) The sample film was dried in a vacuum drying furnace.

(8) The weight of the sample film was measured to derive the graft ratio.

(9) The graft ratio was found to be 29.4%.

Example 32

(1) For the substrate (sample film), a 50 μm thick polyvinylidene fluoride (PVDF) film was used.

(2) The sample film was irradiated with O ions of 100 MeV, accelerated by a cyclotron.

(3) Ion irradiation was carried out at an ion irradiation density (fluence) set at $3\times10^{10}$ (ions/cm$^2$).

(4) The sample film was taken out from the irradiation chamber into the air, and then immersed in a solution (100%) of St.

(5) The solution was heated to 60° C., and the polymerization was allowed to proceed for a polymerization time of 24 hours.

(6) The sample film was taken out and immersed in a toluene solution; the toluene solution was heated to 60° C. to remove the homopolymers.

(7) The sample film was dried in a vacuum drying furnace.

(8) The weight of the sample film was measured to derive the graft ratio.

(9) The graft ratio was found to be 72.3%.

Example 33

(1) For the substrate (sample film), a 100 μm thick polyethylene-tetrafluoroethylene copolymer (ETFE) film was used.

(2) The sample film was irradiated with Ar ions of 100 MeV, accelerated by a cyclotron.

(3) Ion irradiation was carried out at an ion irradiation density (fluence) set at $3\times10^{10}$ (ions/cm$^2$).

(4) The sample film was taken out from the irradiation chamber into the air, and then immersed in a solution (100%) of St.

(5) The solution was heated to 60° C., and the polymerization was allowed to proceed for a polymerization time of 24 hours.

(6) The sample film was taken out and immersed in a toluene solution; the toluene solution was heated to 60° C. to remove the homopolymers.

(7) The sample film was dried in a vacuum drying furnace.

(8) The weight of the sample film was measured to derive the graft ratio.

(9) The graft ratio was found to be 82.4%.

Figure 1:
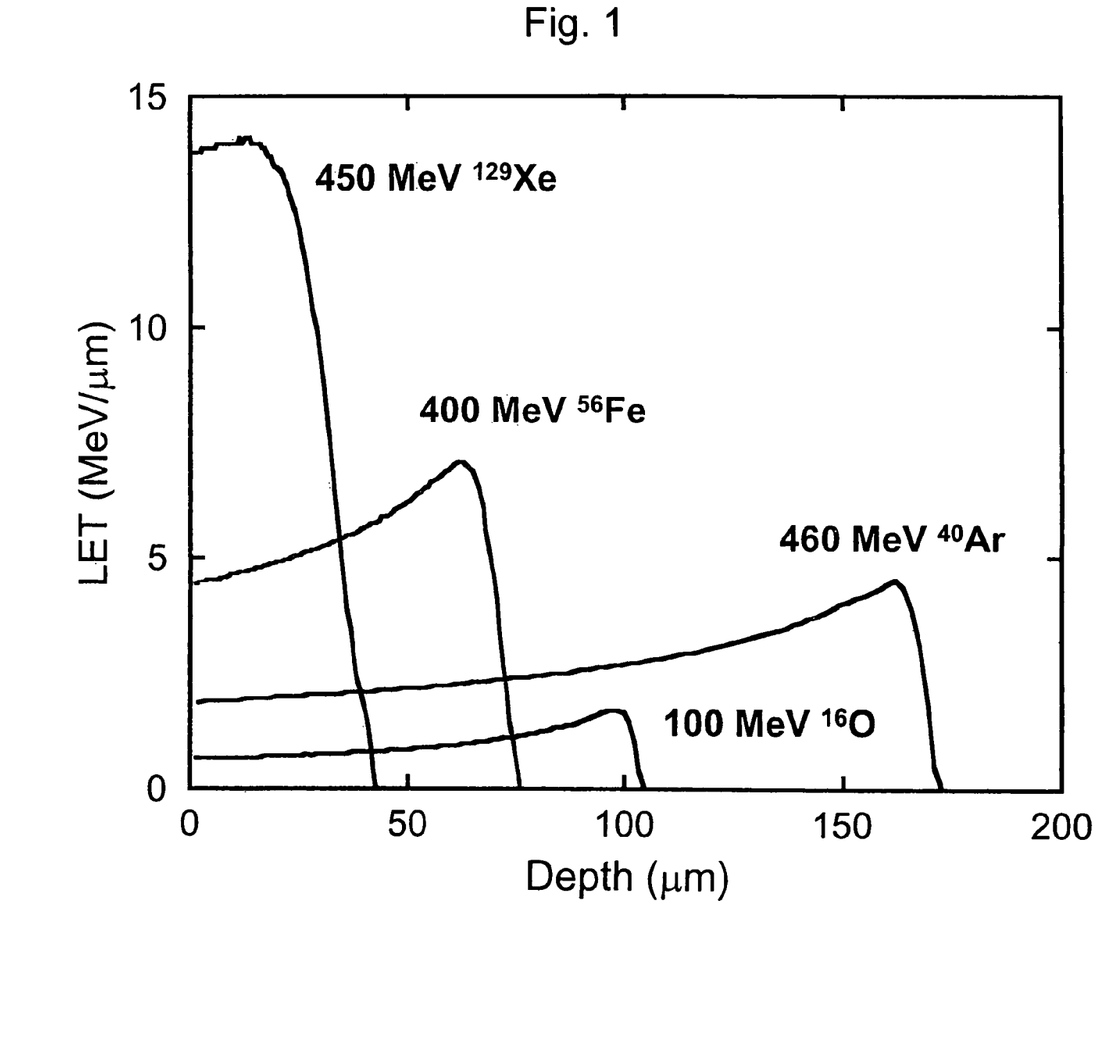
FIG. 1 is a graph showing calculated values for the relation between LET corresponding to the imparted energy amount and the depth, for the ion species of Xe, Fe, O and Ar.

FIG. 1 is a graph showing calculated values for the relation between LET corresponding to the imparted energy amount and the depth, for the ion species of Xe, Fe, O and Ar.

When the ions equal in mass to or smaller in mass than Fe are used, the imparted energy is small, so that radical generation leading to polymerization has hitherto been out of the scope. However, it has been found that when Fe, O, Ar and the like are used, radicals can be generated and polymerization can be carried out, so that electrolyte membranes large in thickness can be obtained. In other words, as revealed from the results of Examples 30 to 33, and from the results shown in FIG. 1, by using O, Fe, Ar and the like as the elements for the ions to be irradiated, even thick polymer films having thickness of, for example, 100 μm or more undergo uniform generation of radicals based on one side ion irradiation to attain high graft ratios.

Accordingly, electrolyte membranes and the like uniform in membrane quality and large in thickness can be obtained, and hence problems such as cross leak are hardly caused.

Examples 34 to 37

(1) For the substrates (sample films), a 25 μm thick ethylene tetrafluoroethylene copolymer (ETFE) film was used.

(2) The sample films were irradiated with Ar ions of 460 MeV, accelerated by a cyclotron.

(3) Ion irradiation was carried out at the ion irradiation density (fluence) values set as shown in Table 4.

(4) The sample films were taken out from the irradiation chamber into the air, and then immersed in a solution (100%) of St.

(5) The solution was heated to 60° C., and the polymerization was allowed to proceed for the polymerization time set as shown in Table 4, for each of the sample films.

(6) The sample films were taken out and immersed in a toluene solution; the toluene solution was heated to 60° C. to remove the homopolymers.

(7) The sample films were dried in a vacuum drying furnace.

(8) The weights of the sample films were measured to derive the graft ratios.

(9) The conductivity in in-plane direction, the conductivity in thickness direction and the dimensional variation rate due to hydration were measured for each of the sample films.

Figure 2:
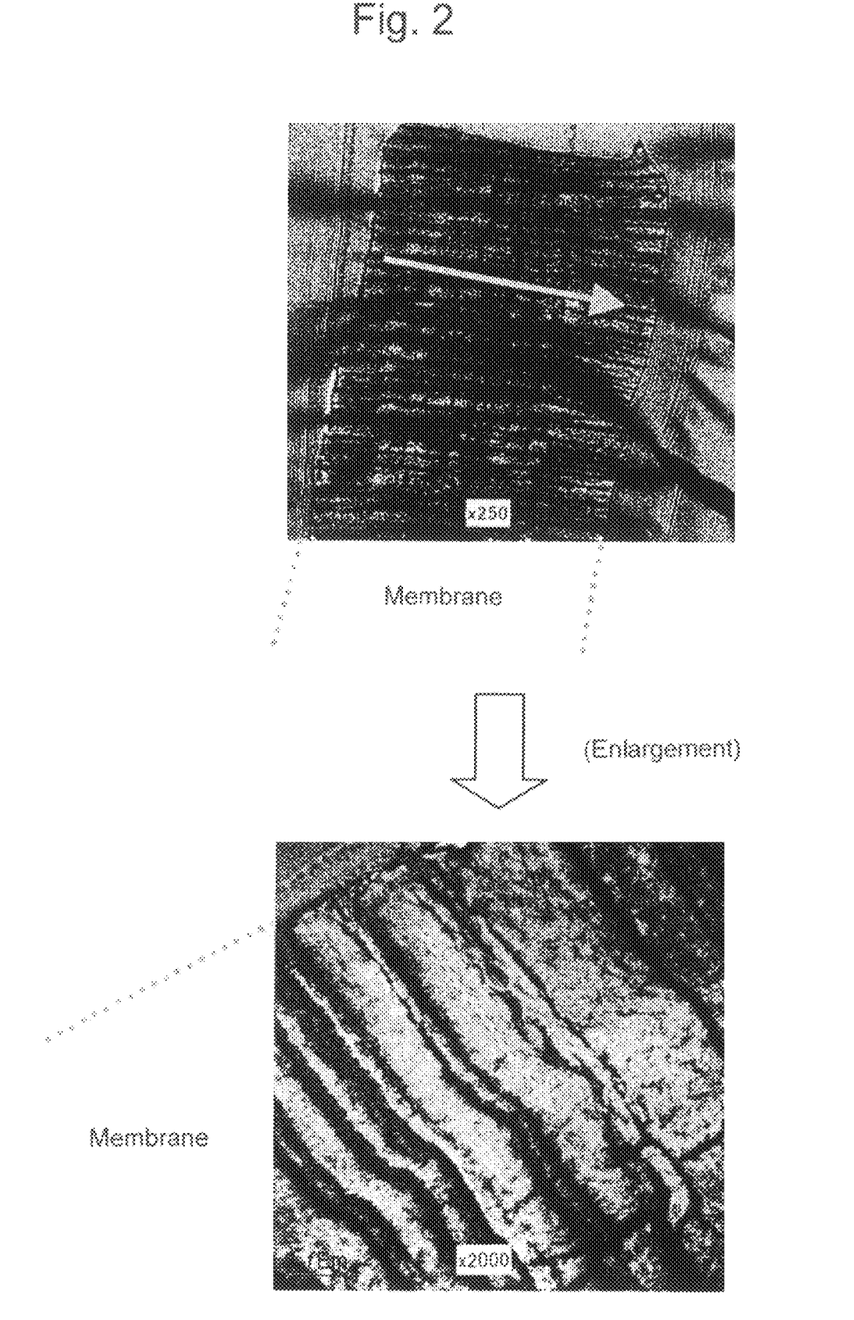
FIG. 2 shows TEM micrograms of a functional membrane obtained by using ethylene tetrafluoroethylene copolymer (hereinafter referred to as ETFE) as the substrate (sample film) and having proton conducting paths cylindrically formed so as to perforate from the front side to the back side.

(10) After dyeing with RuO$_4$, TEM observation was carried out to observe the distribution of St for each of the sample films. The results thus obtained are shown in FIG. 2. It is to be noted that the arrow in the figure indicates the ion irradiation direction.

TABLE 4

| Condition | Temperature: 80° C., humidity: 90% RH | | | |
|---|---|---|---|---|
| Sample | Example 34 | Example 35 | Example 36 | Example 37 |
| Ion irradiation density (ions/cm$^2$) | $3 \times 10^7$ | $3 \times 10^8$ | $3 \times 10^7$ | $3 \times 10^8$ |
| Polymerization time (h) | 96 | 96 | 192 | 192 |
| Polymerization ratio (%) | 1.1 | 3.2 | 5.2 | 10.7 |
| Dimensional variation rate (%) | 100 | 100 | 102 | 103 |
| Conductivity in in-plane direction (S/cm) | 2.8E−06 | 1.9E−06 | 1.6E−04 | 3.6E−03 |
| Conductivity in thickness direction (S/cm) | 2.8E−04 | 1.8E−03 | 2.3E−03 | 1.9E−02 |

As shown in Table 4, the conductivities in thickness direction are larger as compared to the conductivities in in-plane direction; thus, it is inferred that proton conducting paths are formed cylindrically in the direction of the thickness. This can be supported by the TEM micrograms shown in FIG. 2. The sample films are excellent in dimensional stability. From these results, the functional membranes of present Examples are found to be suitable for electrolyte membranes for use in fuel cells.

Examples 38 to 41

(1) For the substrates (sample films), a 25 μm thick polyvinylidene fluoride (PVDF) film was used.

(2) The sample films were irradiated with Ar ions of 460 MeV, accelerated by a cyclotron.

(3) Ion irradiation was carried out at the ion irradiation density (fluence) values set as shown in Table 5.

(4) The sample films were taken out from the irradiation chamber into the air, and then immersed in a solution (100%) of St.

(5) The solution was heated to 60° C., and the polymerization was allowed to proceed for the polymerization time set as shown in Table 5, for each of the sample films.

(6) The sample films were taken out and immersed in a toluene solution; the toluene solution was heated to 60° C. to remove the homopolymers.

(7) The sample films were dried in a vacuum drying furnace.

(8) The weights of the sample films were measured to derive the graft ratios.

(9) The conductivity in in-plane direction and the conductivity in thickness direction were measured for each of the sample films.

Figure 3:
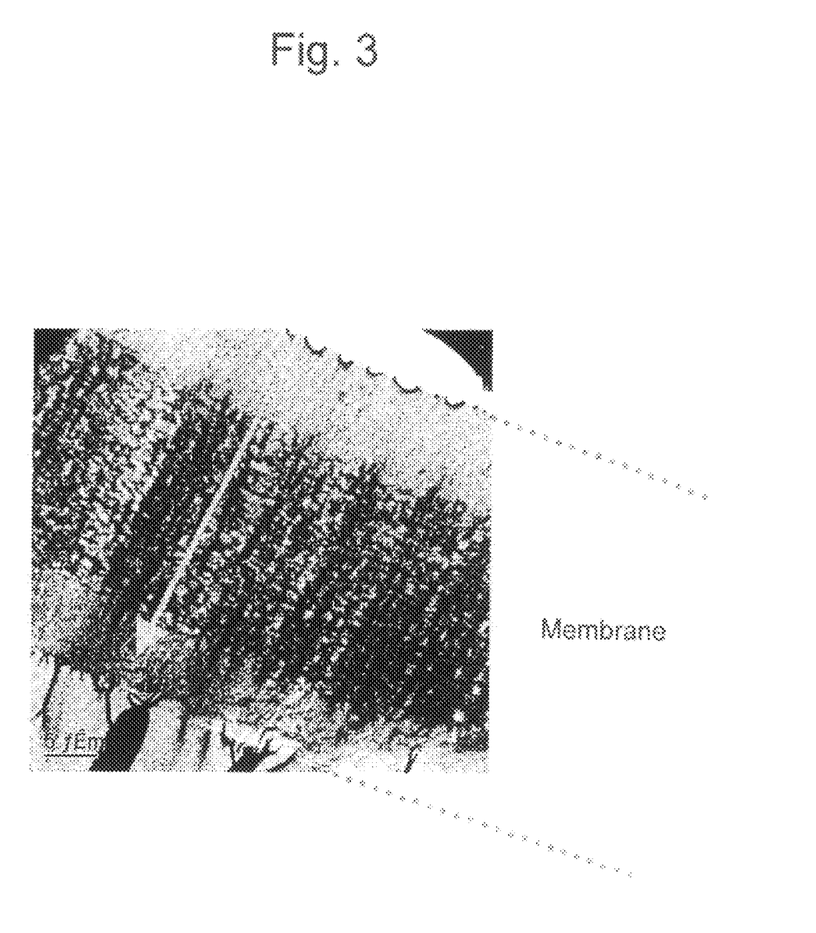
FIG. 3 is a TEM microgram of a functional membrane having a three-layered structure obtained by using polyvinylidene fluoride (PVDF) as the substrate (sample film).

(10) After dyeing with RuO$_4$, TEM observation was carried out to observe the distribution of St for each of the sample films. The results thus obtained are shown in FIG. 3. It is to be noted that the arrow in the figure indicates the ion irradiation direction.

TABLE 5

| Condition | Temperature: 80° C., humidity: 90% RH | | | |
|---|---|---|---|---|
| Sample | Example 38 | Example 39 | Example 40 | Example 41 |
| Ion irradiation density (ions/cm$^2$) | $3 \times 10^7$ | $3 \times 10^8$ | $3 \times 10^7$ | $3 \times 10^8$ |
| Polymerization time (h) | 96 | 96 | 192 | 192 |
| Polymerization ratio (%) | 3 | 5 | 8 | 24 |
| Conductivity in in-plane direction (S/cm) | 8.0E−04 | 6.0E−03 | 6.6E−03 | 7.0E−02 |
| Conductivity in thickness direction (S/cm) | 4.0E−04 | 3.0E−03 | 3.2E−03 | 3.5E−02 |

As can be seen from the results shown in Table 5, the conductivities in in-plane direction are larger as compared to the conductivities in thickness direction, and thus, the formation of the proton conducting paths is specific. As can be seen from the TEM microgram shown in FIG. 3, the membrane has a three-layered structure in which the proton conducting paths are formed only in the central portion. From these results, the functional membranes of present Examples are found to be suitable for various applications.

INDUSTRIAL APPLICABILITY

The functional membrane of the present invention can be imparted with functional portions controlled in nano-order by introducing functional groups only into the positions of the latent tracks formed in a polymer film substrate by being damaged by the irradiation of high energy heavy ions, and hence can maintain the physical properties of the polymer film substrate unchanged. Alternatively, the functional membrane of the present invention can be imparted with functional portions controlled in nano-order by introducing functional groups only into the surface and pore wall of the perforated film substrate obtained by forming through pores having a cylindrical, conical, hand drum-shaped or funnel-shaped sectional form in the film substrate by chemically or thermally etching the irradiation damages having been formed by irradiation of the polymer film substrate with high energy heavy ions, and hence can maintain the physical properties of the polymer film substrate unchanged.

As described above, the present invention can provide a polymer electrolyte membrane optimal for an electrolyte membrane for use in a fuel cell, high in proton conductivity and excellent in gas barrier property, and thus makes a contribution to the expansion of the use of fuel cells.

The invention claimed is:

1. A production method of a functional membrane, comprising:
- an ion irradiation step in which a polymer film substrate is irradiated with high energy heavy ions at $10^4$ to $10^{14}$ ions/cm$^2$, to form irradiation damages in said film substrate;
- an etching step in which after said ion irradiation step, said irradiation damages are subjected to chemical or thermal etching to form through pores in said film substrate; and
- a graft polymerization step in which the perforated film substrate thus obtained is added with monomers comprising group A monomers and 5 to 80 mol % group B monomers, wherein group A monomers each have a functional group and group B monomers are crosslinking agents, and said monomers are graft-polymerized only to the surface and pore wall of said film substrate by utilizing the active species still remaining in the positions of the latent tracks formed by being damaged by the ion irradiation or by utilizing active species newly generated by irradiation of any of radiation and plasma under vacuum or in an atmosphere of an inert gas.

2. The production method of a functional membrane according to claim 1, wherein said radiation is selected from one or more of γ-ray and electron beam.

3. The production method of a functional membrane according to claim 1, wherein when said active species remaining in the positions of the latent tracks are utilized, said monomer(s) is graft polymerized only to the pore wall of the through pores having pore sizes falling within a range from 1 to 250 nm.

4. The production method of a functional membrane according to claim 1, wherein when said active species newly generated by irradiation of any of radiation and plasma under vacuum or in the atmosphere of an inert gas are utilized, said monomer(s) is graft polymerized only to the pore wall of the through pores having pore sizes falling within a range from 1 nm to 5 μm and to the surface of said film substrate.

5. The production method of a functional membrane according to claim 4, wherein in said graft polymerization step, any of radiation and plasma is preirradiated and said monomer(s) is subjected to post-graft polymerization.

6. The production method of a functional membrane according to claim 4, wherein in said graft polymerization step, after the introduction of said monomer(s) into said film substrate, said monomer(s) is subjected to simultaneous graft polymerization while the irradiation of any of radiation and plasma is being conducted.

7. The production method of a functional membrane according to claim 1, wherein the functional membrane has a graft ratio of 50% or less.

8. The production method of a functional membrane according to claim 1, wherein the functional membrane has a graft ratio of 20% or less.

9. The production method of a functional membrane according to claim 1, wherein the functional membrane has a graft ratio of 9.9% or less.

10. The production method of a functional membrane according to claim 1, wherein said polymer film substrate has an oxygen permeation coefficient of 10.0 [cc·mm/(m$^2$·day·atm)] or less at room temperature.

* * * * *